United States Patent [19]

Spiotta et al.

[11] Patent Number: 5,056,012
[45] Date of Patent: Oct. 8, 1991

[54] MEMORY ADDRESSABLE DATA TRANSFER NETWORK

[75] Inventors: Mark G. Spiotta, Algonquin; John P. Foley, Palatine, both of Ill.

[73] Assignee: Motorola, Inc., Schaumburg, Ill.

[21] Appl. No.: 277,740

[22] Filed: Nov. 30, 1988

[51] Int. Cl.[5] .................... G06F 13/14; G06F 13/42; G06F 5/01

[52] U.S. Cl. .................. 364/200; 364/242.94; 364/242.95; 364/239.2; 364/229; 364/239.9

[58] Field of Search ... 364/200 MS File, 900 MS File, 364/422; 365/221; 370/85; 340/825.060

[56] References Cited

U.S. PATENT DOCUMENTS

| | | | |
|---|---|---|---|
| 4,398,264 | 8/1983 | Couper et al. | 364/900 |
| 4,717,914 | 1/1988 | Scott | 340/825.060 |
| 4,745,598 | 5/1988 | Ulug | 370/89 |
| 4,750,114 | 6/1988 | Hirtle | 364/200 |
| 4,751,648 | 6/1988 | Sears, III et al. | 364/422 |
| 4,754,452 | 6/1988 | Henry | 370/85 |
| 4,835,674 | 5/1989 | Collins et al. | 364/200 |
| 4,862,419 | 8/1989 | Hoberman | 365/221 |

Primary Examiner—Thomas C. Lee
Assistant Examiner—Daniel Pan
Attorney, Agent, or Firm—Joseph P. Krause

[57] ABSTRACT

A data transfer network for computers is disclosed which combines characteristics of both multi-port memory devices and local area networks. Each computer is coupled to the network via a data terminal. The terminal permits the network to appear to the computers as random access memory. Data written into this RAM by the computers is formatted by the terminals into serial data packets, which are shifted around a serially connected ring or loop of the terminals. The loop connected terminals form the network.

7 Claims, 3 Drawing Sheets

MEMORY ADDRESSABLE DATA TRANSFER NETWORK

BACKGROUND OF THE INVENTION

This invention generally relates to computer networks. More specifically, this invention relates to devices used for transferring data between computers.

Data transfer networks typically comprise either multiple-port memory devices, such as two-port memories useable by one or two computers, or local area networks which permit many computers to read, write and share data from a common data bus.

A significant limitation of prior art multiple-port memory devices has been the inability to readily accommodate more than two or three computers coupled to the memory. Two-port memory devices are readily available and relatively easy to use but cannot accommodate multiple machines. Memory devices having more than two or three ports are difficult to implement due to the multitude of connections required to serve additional computers. Sharing data among many computers typically requires a more complex system such as a local area network.

A local area network, or LAN as it is known in the art, is a network of computers connected together to share data over a serial data bus. The computers transfer data around the network or ring by each computer receiving a packet of data on the serial bus, decoding the packet to decide if the packet is directed to it, and passing the packet on to the next computer in the network. Local area networks can accomplish a high speed data transfer among many computers but they require relatively complex software overhead to control data transferred around the network.

A need therefore exists for a computer data transfer network implemented substantially or entirely in hardware, thus avoiding complex software overhead, which allows many computers to access data transferred on the network. The ideal high speed data transfer network would combine the most desirable characteristics of both local area networks and multi-port memory devices.

SUMMARY OF THE INVENTION

Accordingly, it is an object of the present invention to provide a data transfer network whereby data can be shared by multiple computers without the software overhead of local area networks, and without the hardware complexity of a multi-port memory capable of serving more than three computers.

To achieve the foregoing object, and other objects, there is provided a data transfer network for transferring data between computers. Each computer on the network is coupled to a terminal which is an interface to the network. The terminals permit the network to appear to the computers as an array of random access memory or RAM. Each RAM location in the terminals has an address wherein data to be transferred via the loop is stored. To transfer data via the loop the data written into the RAM is formatted by the terminals into serial data packets, which are shifted around a serially connected ring of terminals. Data from the addressed RAM of one terminal, after being formatted into a serial data packet, is transferred to corresponding locations in the RAM of another terminal. Once in the RAM of the terminal, a computer coupled to the RAM can access the data.

The serial data packet has a predefined format which establishes the ordering of words of the packet and the ordering of bits in words to permit decoding of the packet by a terminal. Terminals of the network are connected electrically in series, with each terminal having a "data-in" port for receiving and a "data-out" port sending data packets.

DETAILED DESCRIPTION OF THE PREFERRED EMBODIMENT

Figure 1:
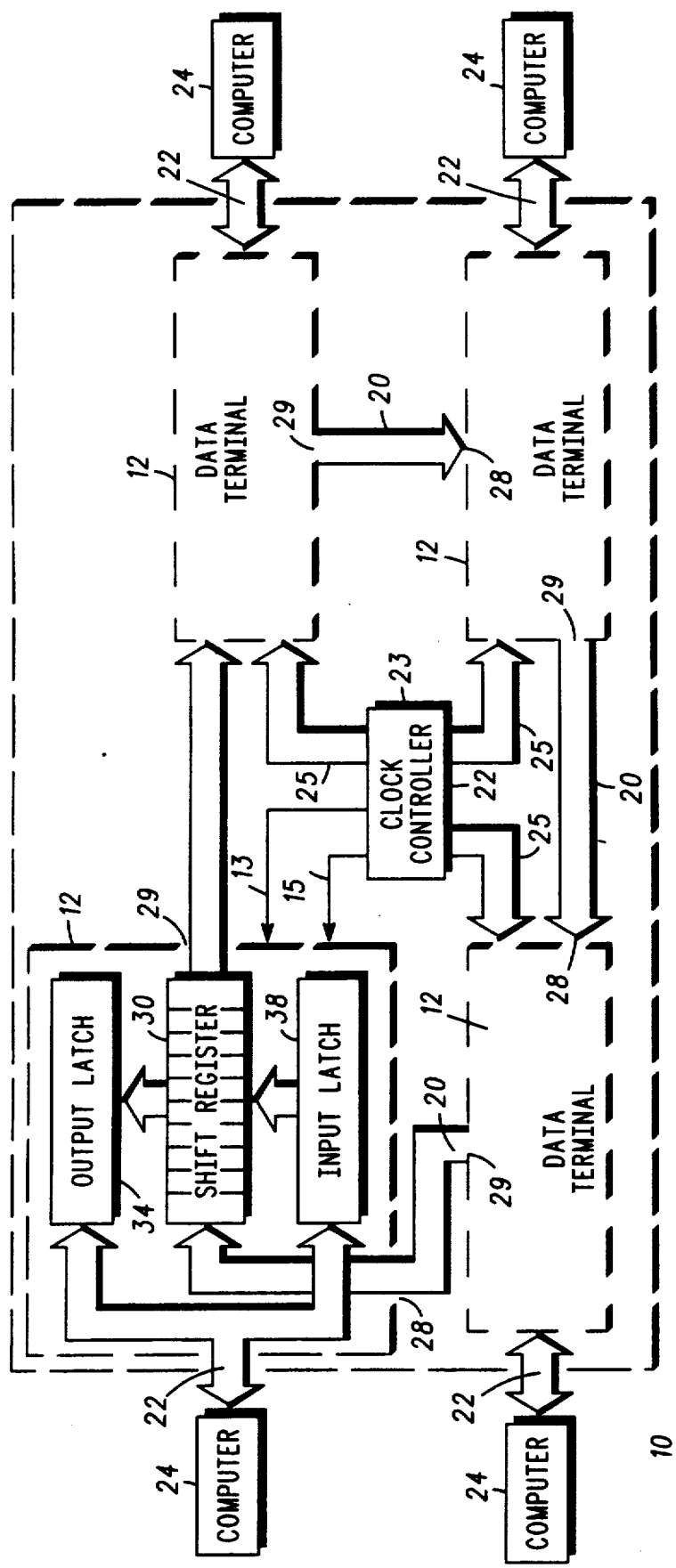
FIG. 1 is a simplified block diagram of a four-node network wherein four computers are coupled to four data terminals connected to form a ring, in accordance with the present invention.

Referring to FIG. 1, there is shown a block diagram of a four-node data transfer network according to the present invention. Data transfer network 10 is a "loop" or "ring" connection of four data terminals 12, each data terminal communicating to its respective computer 24 through a bidirectional bus 22. Each bus 22 includes address and data lines and control signals such as read/write lines and input/output control signals, well known in the art.

Data terminals 12 are connected together via serial data path 20, which in the preferred embodiment is a pair of wires, but could also be a fiber optic transmission path, or any other suitable transmission media. Serial data traveling via serial data path 20 travels in one direction, as indicated by the arrows, due to the particular orientation of data ports chosen for FIG. 1. Data flow in the network would ordinarily be "circulating" around the loop in a single direction, with the particular direction of the circulation being unimportant. However, it is contemplated that the present invention could be implemented with a 2-way data transfer ring.

Figure 2:
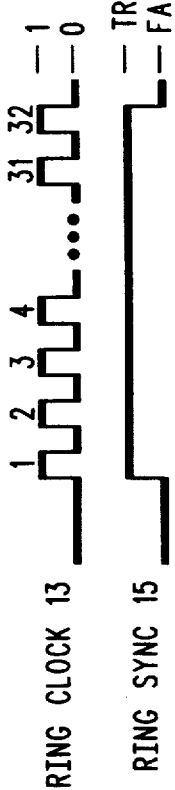
FIG. 2 represents a timing diagram of particular control signals provided to the data terminals of the loop shown in FIG. 1.

Data bits (shown as clock pulses 1 through 32 in FIG. 2) are transmitted from the transmit data ports 29 into receive data ports 28 around path 20 under the control of a clock controller 23. The clock controller 23 provides the essential clock pulses to all terminals on the network via a clock bus 25, which carries a ring clock signal 13 and a ring sync signal 15, as shown in FIG. 2, for timing the shifting of individual bits and indicating when a data packet has been transferred. In the preferred embodiment, the function of clock controller 23 is included into one network terminal designated the network master terminal. In FIG. 1, clock signals from controller 23 synchronize the formation of the serial data word in terminals 12 and control the transmission and reception of serial data bits from terminals 12 on data paths 20.

Referring now to FIG. 2, there is shown a timing diagram showing ring clock signal 13 and ring sync signal 15 carried on clock bus 25 and used for timing the transfer of serial data bits between terminals. Ring sync 15 is an enable pulse to terminals 12, indicating to all terminals of the network when a serial data packet is being transferred along data path 20. When the ring sync signal is true or logic 1, ring clock pulses 13 are sent to terminals 12 to synchronize the transfer of individual serial data bits around the loop. In FIG. 2, thirty two ring clock pulses 13 are shown which would be required to shift, four, 8-bit data words through a data terminal 12. A terminal having, for example, five, 8-bit data locations would require at least forty, ring clock pulses 13 while ring sync 15 is "true" to shift forty bits of data.

Figure 3:
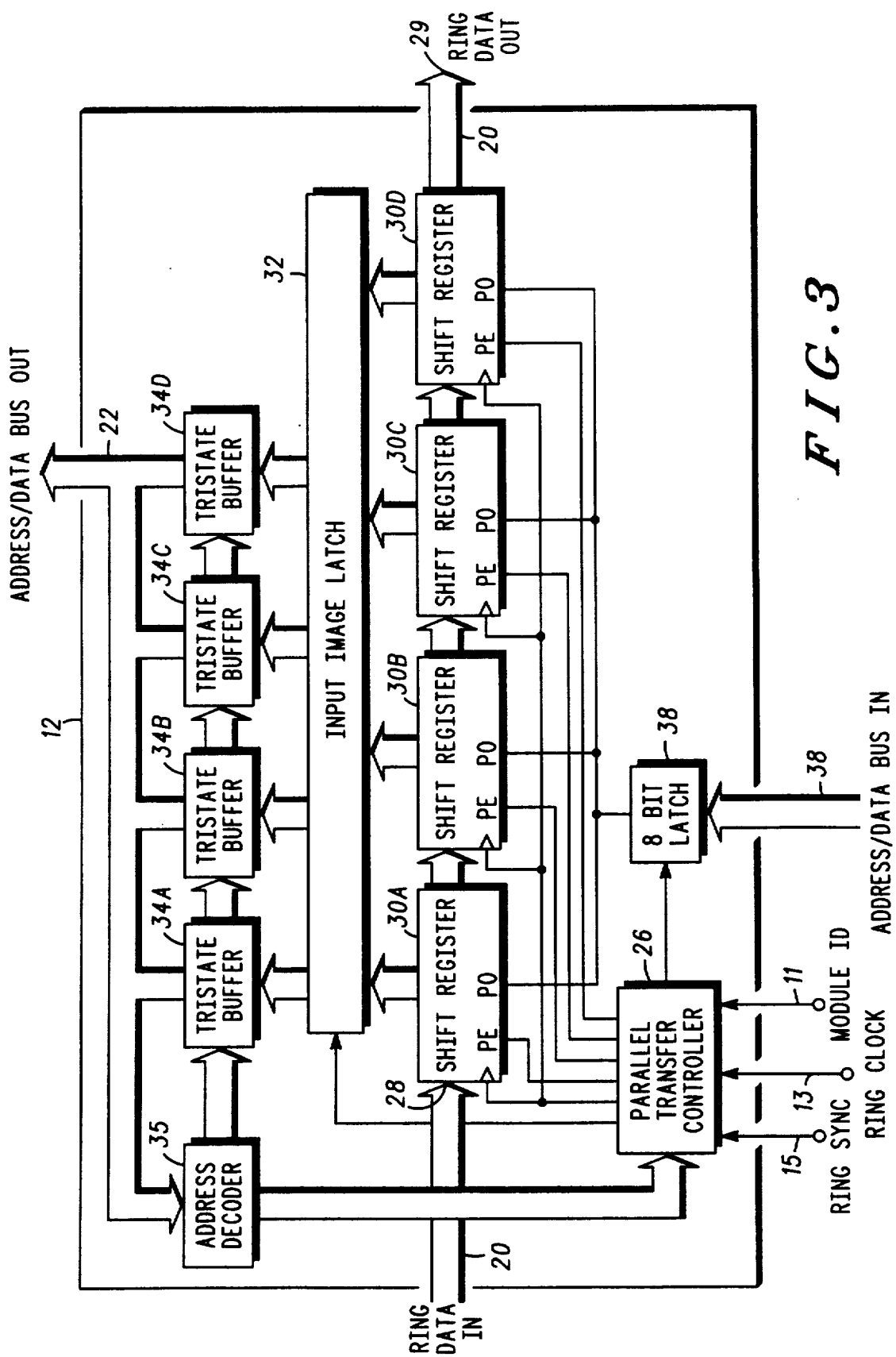
FIG. 3 is a detailed block diagram of the present invention in accordance with the preferred embodiment of the implementation of a data terminal.

Referring to FIG. 3, a data terminal capable of serving a computer in a four node data transfer network is shown in detail. In FIG. 3, terminal 12 is configured with four, 8-bit tristate buffers 34A, 34B, 34C and 34D, from which data is read by computer 24 and one 8-bit "writable" latch 38 to which data is written by computer 24. (The four, 8-bit tristate buffers 34A, 34B, 34C, and 34D shown in FIG. 3 comprise the output latch 34, shown in FIG. 1). Only latch 38 can accept data from computer 24 (not shown in FIG. 3) whereas buffers 34A through 34D provide four readable words, sending data to computer 24 from the input image latch 32 when computer 24 addresses these buffers. Data latch 38 in combination with buffers 34A through 34D provide to computer 24 what appears to be random access memory or RAM with the exception that only one location of this RAM is writable. (The input latch 38, shown in FIG. 3, comprises the input latch 38 shown in FIG. 1.).

Selection of the "readable" and "writable" locations by a computer 24 is accomplished by means of address decoder 35 and parallel transfer controller 26 decoding address lines in bus 20 from the computer 24. Address decoder 35 and parallel transfer controller 26 decode address lines from computer 24 to permit data from buffers 34A through 34D to be output onto computer 24 data bus and permit data from computer 24 data bus to be written in latch 38.

In the embodiment depicted in FIG. 3, one location of the four addressable locations may be written to by a particular computer. Alternate embodiments of the invention however could permit more or less than four addressable locations and could permit a computer to write to possibly more than one location. Permitting a computer to write to more than one location, however, would require that other computers on the network "know" how many locations were writable by a computer and know the addresses of these writable locations.

Encoding and decoding of the serial data packets passed around the loop is by means of serial-to-parallel and parallel-to-serial conversion of data passing through shift registers 30A, 30B 30C and 30D shown in FIG. 3. Shift register 30 receives as shown in FIG. 1 serial data packets from identical another shift register in the prior terminal 12, (which is coupled to another computer 24) via data path 20 through receive port 28. As shown in FIG. 3, thirty-two serial bits of data, corresponding to 4, 8-bit data words, would be clocked from receive data port 28 into shift registers 30 by means of the ring clock signal 13 and ring sync signal 15 of FIG. 2. Ring sync signal 15 permits terminal 12 to detect the end of an incoming serial data packet and form a parallel data word.

After the 32'nd bit of a serial data packet from receive port 28 is clocked in, transfer controller 26 loads the 32-bits from shift registers 30 into input image latch 32, thereby forming a single thirty-two-bit data word. The transfer of serial bits to input image data latch 32 thus performs a serial-to-parallel conversion. Address decoder 35 interprets signals on the address lines of computer 24, coupled to terminal 12 and enables a particular tri-state data buffer in the array of data buffers, 34A through 34E to present a single 8-bit word to the computer 24. Address decoder 35 in combination with transfer control 26 also enables the writing of data from computer 24 into the single 8-bit write data latch 38 shown in FIG. 3.

Transmitting a serial data packet from a particular terminal 12 is performed in a manner similar to reading a serial data packet as described above. Data written by a computer 24 into write latch 38, is clocked by transfer control 26, into predetermined bit positions of the 32-bit data word resident in shift registers 30 by means of a parallel data load of bits from latch 38 into shift registers 30 while the ring sync signal is false. The particular positions into which data from latch 38 is loaded into shift registers 30 corresponds to the address of the particular location writable by computer 24, with respect to the other 8-bit words in shift registers 30.

The serial data packet, which is in shift registers 30 and which is to be transferred to the next terminal, is formed by serially outputting the contents of shift registers 30, including any new data written by a computer, to the transmit port 29. When ring sync 15 next goes true, data comprising a serial data packet, including any new data, is clocked out of transmit port 29. Note that as a serial data packet is being clocked out of shift registers 30A through D, another serial data packet is simultaneously being clocked into shift registers 30A through D as described above. Data in the serial data packets is continuously transferred through the shift registers 30A through D of each terminal according to clock pulses of ring sync signal 15 and ring clock signal 13.

To transfer a data word on the network shown in FIG. 1, a computer writes the data word into its particular writable location in its terminal 12. When ring sync signal goes false then goes true, the data word written by the computer, along with all other data words in the terminal, is transferred as a part of a serial data packet to the next adjacent terminal of the loop where the serial data packet is decoded into parallel data. This next terminal re-transmits the data word from the first computer, along with other data words, to another terminal where the serial data packet is again converted to the contents of memory locations in the terminal. The process of receiving serial data packets, converting them to parallel data, and retransmitting the parallel data as serial is repeated continuously allowing data to be shifted completely around the network.

In the preferred embodiment, data terminals 12 were implemented using an Application Specific Integrated Circuit or ASIC. Pre-packaged logic devices could also be used to implement the data terminals as well. Tri-state buffers such as 74LS541 could be used for buffers 34A through 34D. The imput image latch 32 could be implemented with four, 74LS374 data latches. Shift registers 30A through 30D could be implemented with four, 74LS299 shift registers. The address decoder could be implemented by random logic gates such as AND, OR, NAND, NOR etc. A microprocessor could also be used to implement the data terminals 12 as well.

Clock controller 23, which in the ASIC of the preferred embodiment was included within a single terminal designated the master terminal, must provide at least two clock signals, Ring Sync and Ring Clock. Ring Sync 15, as shown in FIG. 2, has a duty cycle such that at least N, ring clock signals 13 can be generated during the time Ring Sync is true, where N is equal to the total number of bits in a serial data packet. Ring Clock must go false at least one Ring Clock period.

Figure 4:
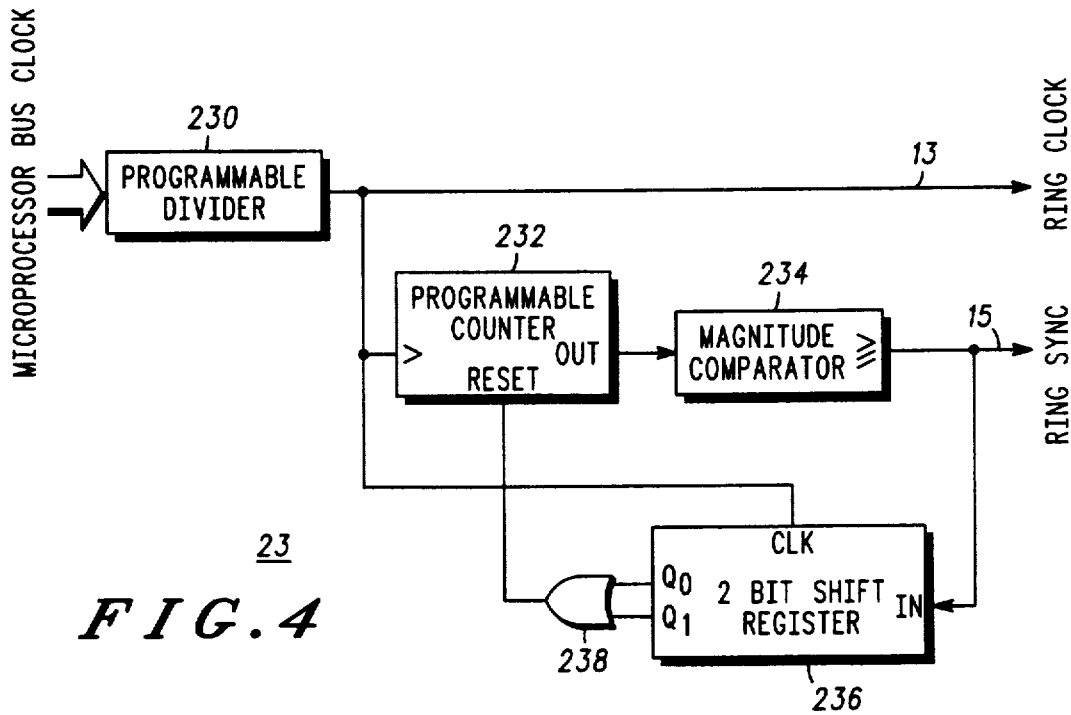
FIG. 4 is a diagram of a clock controller providing timing signals for the invention.

As shown in FIG. 4, clock controller 23 could be implemented with a clock pulse source, such as the microprocessor bus clock and appropriate logic circuitry to provide the desired pulse trains. A 74LS716 programmable divider (230) is shown in combination with two 74LS163 programmable counters (232), a 74LS85 magnitude comparator (234), a 74LS74 2-bit shift register (236) and a 74LS32 OR gate (238) to provide ring clock 13 and ring sync 15. Alternatively Clock Controller could be implemented with a microcomputer or microcontroller as those skilled in the art will recognize.

Figure 5:
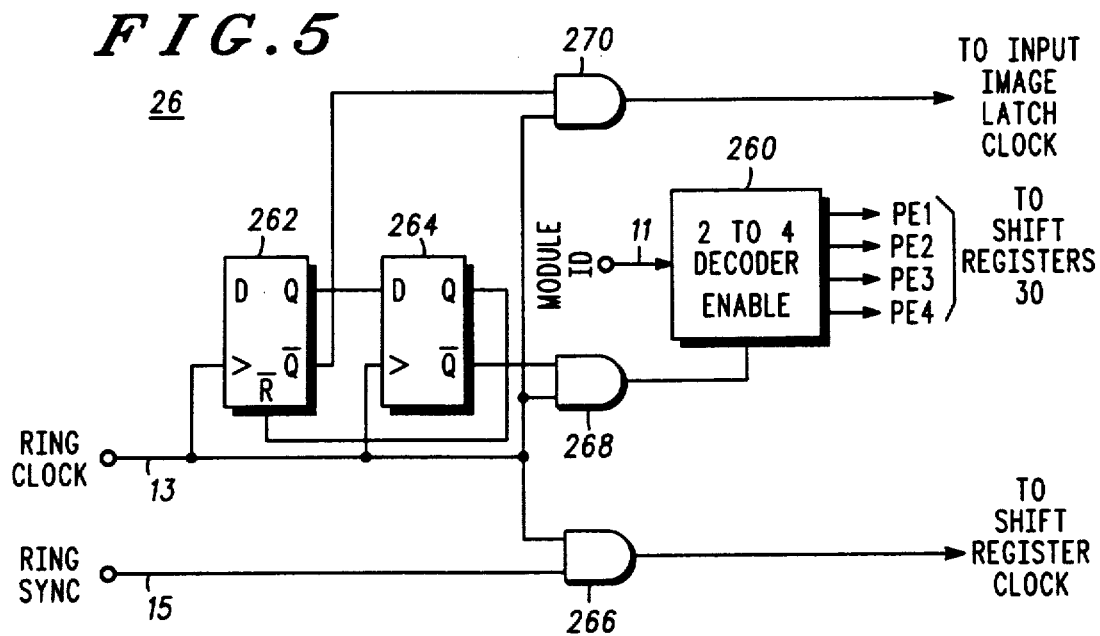
FIG. 5 is a parallel transfer controller required to time data transfers in the invention.

The parallel transfer controller 26 could also be implemented with either a microprocessor or 7400 series logic devices. As shown in FIG. 5, parallel transfer controller (267) is implemented with a 74LS155 2-to-4 decoder (260), in combination with 2, 74LS74 flip-flops (262,264) and 3 74LS08 AND gates (266,268,270). A module id 11 input, which is an input from computer 24 address bus serving to memory map the terminal, is used to identify the terminal 12 as a particular address or range of address.

While a specific embodiment of the invention has been shown and described herein, further modifications and improvements may be made by those skilled in the art. Modifications which retain the basic underlying principles disclosed and claimed herein are within the scope of this invention.

What is claimed is:

1. A computer data transfer network for transferring data between at least first, second and third computers, each of said computers being operatively coupled to said network through a plurality of memory means, said computers providing data to be transferred over said network and receiving data transferred on said network, said network comprised of: at least:

a first memory means, coupled to said first computer, for providing, at least first, second, and third storage locations within said first memory means, each storage location of said first memory means being readable by only said first computer, said first storage location of said first memory means having a first address and being capable of accepting and storing data from only said first computer, said second and third storage locations having second and third addresses not being capable of accepting and storing data from said first computer, each storage location in said first memory means having an address that uniquely identifies each storage location in said first memory means and identifies which of said first, second, and third computers is capable of storing data within said storage locations said first memory means including encoding means for encoding data in the storage locations into serial data packets and including means for transmitting said serial data packets from said first memory means, and including decoding means for decoding serial data packets received by said first memory means into parallel data words and for transferring said parallel data words into predetermined locations of said first, second, and third storage locations within said first memory means;

a second memory means, coupled to said second computer, for providing, at least first, second, and third storage locations within said second memory means, each storage location of said second memory means being readable by only said second computer, said second storage location of said second memory means having a second address and being capable of accepting and storing data from only said second computer, said first and third storage locations of said second memory means having first and third addresses and not being capable of accepting and storing data from said second computer, each storage location in said second memory means having an address that uniquely identifies each storage location in said second memory means and identifies which of said at least first, second, and third computers is capable of storing data within said at least first, second and third storage locations, being capable of accepting and storing new data from only said second computer, said second memory means including encoding means for encoding data in the storage locations into serial data packets and including means for transmitting said serial data packets from said second memory means, and including decoding means for receiving serial data packet from said first memory means and for decoding serial data packets received by said second memory means from said first memory means into parallel data words and for transferring said parallel data words into predetermined locations of said first, second, and third storage locations;

a third memory means, coupled to said third computer, for providing, at least first, second, and third storage locations within said third memory means, each storage location of said third memory means being readable by only said third computer, said third storage location of said third memory means having a third address and being capable of accepting and storing data from only said third computer, said first and second storage locations having first and second addresses not being capable of accepting and storing data from said first computer, each storage location in said third memory means having an address that uniquely identifies each storage location in said third memory means and identifies which of said first, second, and third computers is capable of storing data within said storage locations, said third memory means including encoding means for encoding data in the storage locations into serial data packets and including means for transmitting said serial data packets from said third memory means to said first memory means, and including decoding means for receiving serial data packets from said second memory means and for decoding serial data packets received from said second memory means into parallel data words and for transferring said parallel data words into predetermined locations of said first, second, and third locations;

data transfer means for transferring serial data packets between said first memory means and said second memory means, between said second memory means and said third memory means; and means for transferring serial data packets between said third memory means and said first memory means.

2. The computer data transfer network of claim 1, wherein said data transfer means further includes a serial data bus.

3. The computer data transfer network of claim 2 where said data transfer means is comprised of:
   shift register means for shifting binary digits into adjacent digit positions, said shift register means having at least output digit terminal for transferring binary signals;
   a serial data bus coupled to said shift register means.

4. The computer data transfer network of claim 3 where said data transfer means includes a fiber optic serial data transmission path.

5. The computer data transfer network of claim 1 further comprising control means, coupled to said first and second memory means, for simultaneously transferring serial data packets via said data transfer means, between said first memory means and said second memory.

6. The computer data transfer network of claim 1 where said encoding means is comprised of at least one data latch means for receiving data from said plurality of individually addressable storage locations, for formatting a serial bit stream for transmission from said transmit port means.

7. The computer data transfer network of claim 1 where said decoding means is comprised of at least one shift register means for receiving serial data from said read port means and at least one data latch means for receiving data from said shift register means and sending data to said plurality of individually addressable storage locations.

* * * * *